US010318997B2

(12) United States Patent
Bhalgat

(10) Patent No.: US 10,318,997 B2
(45) Date of Patent: Jun. 11, 2019

(54) DETERMINING BID AMOUNTS FOR PRESENTING SPONSORED CONTENT TO A USER BASED ON A LIKELIHOOD OF THE USER PERFORMING A CONVERSION ASSOCIATED WITH THE SPONSORED CONTENT

(71) Applicant: Facebook, Inc., Menlo Park, CA (US)

(72) Inventor: Anand Sumatilal Bhalgat, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 504 days.

(21) Appl. No.: 15/136,538

(22) Filed: Apr. 22, 2016

(65) Prior Publication Data
US 2017/0308933 A1    Oct. 26, 2017

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0275* (2013.01); *G06Q 30/0257* (2013.01); *G06Q 30/0273* (2013.01); *G06Q 50/01* (2013.01)

(58) Field of Classification Search
CPC . G06Q 30/0275; G06Q 30/0257; G06Q 50/01
USPC ............. 705/14.49, 14.69, 14.71, 14.73
See application file for complete search history.

(56) References Cited

U.S. PATENT DOCUMENTS

| 8,175,914 | B1* | 5/2012 | Benson | G06Q 10/025 705/14.41 |
| 8,650,530 | B2* | 2/2014 | Manos | G06F 8/10 717/100 |
| 2006/0004628 | A1* | 1/2006 | Axe | G06O 30/02 705/14.46 |
| 2008/0103792 | A1* | 5/2008 | Flake | G06Q 30/00 705/14.4 |
| 2008/0103953 | A1* | 5/2008 | Flake | G06Q 30/02 705/37 |

(Continued)

OTHER PUBLICATIONS

Balachnader, Subramanian, et al. "Pricing of Advertisements on the Internet." Purdue CIBER Working Papers, 2007. (Year: 2007).*

(Continued)

*Primary Examiner* — Luis A Brown
(74) *Attorney, Agent, or Firm* — Fenwick & West LLP

(57) ABSTRACT

An online system receives a sponsored content item including a maximum amount of compensation for accessing the content, a budget, and a tracking mechanism identifying an action. When an opportunity to present sponsored content to a user eligible to be presented with the sponsored content item is identified, the online system determines a likelihood of the user performing the action identified by the tracking mechanism and an average likelihood of other users performing the action identified by the tracking mechanism. Based on the determined likelihood and the average likelihood, the online system determines a subsidy value. Additionally, the online system generates a penalty value inversely proportional to a number of the identified action that have been identified. The online system increases a bid amount by the subsidy value decreases the bid amount by the penalty value to determine whether to present the sponsored content item to the user.

20 Claims, 2 Drawing Sheets

(56) References Cited

U.S. PATENT DOCUMENTS

| | | | | |
|---|---|---|---|---|
| 2009/0210287 A1* | 8/2009 | Chickering | G06Q 30/02 | 705/14.71 |
| 2011/0106630 A1* | 5/2011 | Hegeman | G06Q 30/02 | 705/14.71 |
| 2012/0226713 A1* | 9/2012 | Park | G06Q 30/02 | 707/780 |
| 2012/0303464 A1* | 11/2012 | Gorman | G06Q 30/02 | 705/14.71 |
| 2013/0018722 A1* | 1/2013 | Libby | G06Q 30/0241 | 705/14.46 |
| 2013/0124308 A1* | 5/2013 | Hegeman | G06Q 10/04 | 705/14.48 |
| 2013/0246169 A1* | 9/2013 | Berry | G06O 30/0276 | 705/14.49 |
| 2013/0339126 A1* | 12/2013 | Cui | G06Q 30/02 | 705/14.41 |
| 2014/0304086 A1* | 10/2014 | Dasdan | G06O 30/0275 | 705/14.71 |
| 2014/0304087 A1* | 10/2014 | Himrod | G06Q 30/0275 | 705/14.71 |
| 2015/0039418 A1* | 2/2015 | Baluja | G06Q 30/0246 | 705/14.45 |
| 2015/0088644 A1* | 3/2015 | Shay | G06O 30/0254 | 705/14.52 |
| 2015/0332314 A1* | 11/2015 | Chakraborty | G06Q 50/01 | 705/14.45 |
| 2015/0348136 A1* | 12/2015 | Yang | G06O 30/0275 | 705/14.71 |
| 2015/0348137 A1* | 12/2015 | Flood | G06Q 30/0275 | 705/14.71 |
| 2016/0292717 A1* | 10/2016 | Bhalgat | G06Q 30/0246 | |
| 2017/0098250 A1* | 4/2017 | Masson | G06Q 30/0275 | |
| 2017/0213245 A1* | 7/2017 | Whitney | G06Q 30/0255 | |
| 2017/0213254 A1* | 7/2017 | Bhalgat | G06Q 30/0275 | |

OTHER PUBLICATIONS

Linden, et al. "The Pollution Effect: Optimizing Keyword Auctions by Favoring Relevant Advertisements." Fifth Workshop on Ad Auctions, Stanford, California, Jul. 6, 2009. (Year: 2009).*

* cited by examiner

DETERMINING BID AMOUNTS FOR PRESENTING SPONSORED CONTENT TO A USER BASED ON A LIKELIHOOD OF THE USER PERFORMING A CONVERSION ASSOCIATED WITH THE SPONSORED CONTENT

BACKGROUND

This disclosure relates generally to presenting content in an online system, and more specifically to pacing of a budget by a user for presenting sponsored content to other users via an online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow users (e.g., businesses) to sponsor presentation of content on an online system to gain public attention for a user's products or services or to persuade other users to take an action regarding the user's products or services. Content for which the online system receives compensation in exchange for presenting to users is referred to as "sponsored content." Many online systems receive compensation from a user for presenting online system users with certain types of sponsored content provided by the user. Frequently, online systems charge a user for each presentation of sponsored content to an online system user or for each interaction with sponsored content by an online system user. For example, an online system receives compensation from an entity each time a content item provided by the user is displayed to another user on the online system or each time another user is presented with a content item on the online system and interacts with the content item (e.g., selects a link included in the content item), or each time another user performs another action after being presented with the content item (e.g., visits a physical location associated with the user who provided the content item).

When providing sponsored content items to an online system for presentation to users of the online system, a user may associate one or more conversion events (also referred to as "conversions") with the sponsored content items. A conversion associated with a sponsored content item specifies an action performed by a user presented with the sponsored content item. Hence, a conversion associated with a sponsored content item specifies a desired action for users presented with the sponsored content item to perform. For example, a user providing a sponsored content item to an online system associates a conversion of accessing a landing page identified by the sponsored content item. In various embodiments, the sponsored content item includes a tracking mechanism including instructions that are executed by a client device presenting the sponsored content item when a user performs the conversion associated with the sponsored content item.

However, conventional online systems are unable to reliably determine likelihoods of users performing many conversions associated with a sponsored content item. For example, a conventional online system determines a likelihood of a user accessing a sponsored content item but is unable to determine a likelihood of the user accessing a landing page or other content associated with the sponsored content item. Accordingly, many users providing sponsored content items to a user specify amounts of compensation to the online system if users presented with the sponsored content item access the sponsored content item. However, selecting sponsored content items based on user interaction with the sponsored content items may not present sponsored content items to users who are likely to perform specific conversions associated with the sponsored content items.

SUMMARY

An online system maintains advertisement requests ("ad requests") and includes various ad requests in one or more selection processes when an opportunity to present one or more advertisements to a user of the online system is identified. An ad request received and maintained by the online system includes an advertisement for presentation to online system users and a bid amount specifying a maximum amount of compensation capable of being provided to the online system for an online system user accessing the advertisement. For example, the bid amount is a maximum amount of compensation the online system will receive from a user who provided the ad request to the online system if an online system user presented with the advertisement accesses the advertisement. Additionally, the advertisement in the ad request includes a tracking mechanism comprising instructions that are executed by a client device presenting the advertisement when a user performs an action associated with the advertisement. Hence, the tracking mechanism allows the user providing the ad request to the online system to specify one or more actions in the tracking mechanism so the tracking mechanism communicates information identifying when one or more of the specified actions were performed. For example, the tracking mechanism is a tracking pixel. In some embodiments, the tracking mechanism is included in additional content and identified by information in the advertisement.

Hence, the ad request identifies a tracking mechanism that identifies an action associated with the advertisement, but includes a bid amount that is based on a user accessing the advertisement rather than performing the action associated with the advertisement. Because the bid amount is based on users accessing the advertisement rather than the action identified by the tracking mechanism, the bid amount may not allow the online system to select the advertisement for presentation to users who are more likely to perform the action identified by the tracking mechanism associated with the advertisement but who are less likely to access the advertisement. To increase the likelihood of the online system selecting the advertisement for presentation to users who are likely to perform the action identified by the tracking mechanism associated with the advertisement, the online system subsidizes the bid amount of the ad request in a selection process performed for a user who is more likely than other users to perform the action identified by the tracking mechanism associated with the advertisement. The online system also determines a penalty value applied to the bid amount for the advertisement in selection processes for various users so the cumulative penalty value for the ad request across multiple selection processes equals the cumulative subsidy for the ad request across multiple selection processes, allowing eh penalty value to fund the subsidy for the ad request.

Additionally, the ad request may include a duration specifying a time interval during which the advertisement in the ad request is eligible for presentation to online system users. In some embodiments, the ad request also includes a budget specifying a maximum amount of compensation capable of being provided to the online system for accessing the advertisement from the online system when it is presented to online system users over the duration; hence, the budget specifies a maximum amount provided to the online system throughout the duration the ad request is presented. The online system may determine a bid amount for the ad request using the budget and the duration included in the ad request to more efficiently allocate the budget throughout the duration. In some embodiments, the ad request is included in an advertising campaign including multiple ad requests. A budget, a duration, and a bid amount may be associated with the advertising campaign so the budget, the duration, and the bid amount in various ad requests in the advertising campaign.

When the online system identifies an opportunity to present one or more advertisements to a user of the online system, if the ad request does not include targeting criteria or includes at least a threshold number of targeting criteria satisfied by characteristics of the user, the online system identifies the ad request as eligible for presentation to the user. Based on information associated with the user by the online system, the online system determines a likelihood of the user performing an action identified by the tracking mechanism included in the advertisement from the ad request. For example, the online system stores information identifying actions previously performed by the user and identifying characteristics of the user (e.g., age, gender, location, etc.) and applies one or more machine learned models to the prior actions by the user and characteristics of the advertisement to determine the likelihood of the user performing the action identified by the advertisement. One or more of the machine learned models may account for actions previously performed by other users having at least a threshold number or a threshold percentage of characteristics matching characteristics of the user with the advertisement or with additional content having at least a threshold number or a threshold percentage of characteristics matching characteristics of the advertisement by additional users to determine the user's likelihood of performing the action identified by the tracking mechanism included in the advertisement.

Additionally, the online system determines an average likelihood of users performing the action identified by the tracking mechanism included in the advertisement from the ad request. In some embodiments, the online system determines an average likelihood of all online system users performing the action identified by the tracking mechanism included in the advertisement from the ad request. Alternatively, the online system determines an average likelihood of users having one or more specific characteristics performing the action identified by the tracking mechanism identified by the advertisement in the ad request. For example, the online system determines an average likelihood of users having characteristics satisfying at least a threshold number or at least a threshold percentage of targeting criteria included in the ad request performing the action identified by the tracking mechanism included in the advertisement. To determine the likelihood of users performing the action identified by the tracking mechanism included in the advertisement form the ad request, the online system applies one or more machine learned models to information stored by the online system identifying prior actions by various users, characteristics of various users, and characteristics of the advertisement. For example, the online system calculates likelihoods of various users performing the action identified by the tracking mechanism (e.g., multiple users having characteristics satisfying one or more targeting criteria included in the ad request) by applying one or more machine learned models to actions previously performed by various users, characteristics of the various users, and characteristics of the advertisement, then determines an average of the likelihood calculated for various users.

Based on a comparison of the likelihood of the user performing the action identified by the tracking mechanism in the advertisement and the average likelihood of online system users performing the action identified by the tracking mechanism in the advertisement, the online system generates a subsidy value. In one embodiment, the subsidy value is a ratio of the likelihood of the user performing the action identified by the tracking mechanism in the advertisement and the average likelihood of online system users performing the action identified by the tracking mechanism in the advertisement. Hence, the subsidy value increases if the likelihood of the user performing the action identified by the tracking mechanism in the advertisement exceeds the average likelihood of online system users performing the action identified by the tracking mechanism in the advertisement. Conversely, the subsidy value decreases if the likelihood of the user performing the action identified by the tracking mechanism in the advertisement is less than the average likelihood of online system users performing the action identified by the tracking mechanism in the advertisement.

The subsidy value also includes a pacing factor that is modified as the ad request is identified as eligible for presentation to users via various opportunities for presenting advertisements to online system users. Modification of the pacing factor of the subsidy value is based on penalty values generated by the online system, further described below, for various identified opportunities to present advertisements to online system users. In various embodiments, the online system determines the pacing factor in the subsidy value so a total of the penalty values generated for the ad request for opportunities to present one or more advertisements to users equals a total of products of pacing factors for opportunities to present advertisements to users and corresponding ratios of likelihoods of users for whom advertisements were selected for presentation during performing the action identified by the tracking mechanism in the advertisement and the average likelihood of online system users performing the action identified by the tracking mechanism in the advertisement for the opportunities. By determining the pacing factor for the subsidy value based on the penalty values for other opportunities to present one or more advertisements to users, the subsidy values and the penalty values for various opportunities to present one or more advertisements to online system users offset each other.

The online system generates the penalty value based on a number of times the action identified by the tracking mechanism in the advertisement has been identified during the duration of the ad request. The number of times the action identified by the tracking mechanism in the advertisement may be obtained from information received by the online system when client devices execute the tracking mechanism or may be obtained from a third party system that receives information when client devices execute the tracking mechanism. In various embodiments, the penalty value is inversely related to a number of times the action identified by the tracking mechanism included in the advertisement has been identified during the duration. For example, the penalty value is generated as a constant reduced by a value that is inversely proportional to a square root of the number of times the action identified by the tracking mechanism included in the advertisement has been identified during the duration (e.g., during a portion of the duration that has lapsed between a starting time of the duration and a time when the opportunity to present one or more advertisements to the user was identified). As an example, the penalty value is generated by decreasing a constant by a ratio of an additional constant (e.g., one) to a square root of the number of times the action identified by the tracking mechanism included in the advertisement has been identified during the duration (e.g., during a portion of the duration that has lapsed between a starting time of the duration and a time when the opportunity to present one or more advertisements to the user was identified). However, the penalty value is may be generated using any suitable function that is inversely related (e.g., inversely proportional) to the square root of the number of times the action identified by the tracking mechanism included in the advertisement has previously been identified during the duration. In some embodiments, the online system has a specified maximum (e.g., 0.15, 0.20) for the penalty value and accounts for the specified maximum when generating 335 the penalty value. For example, the online system generates the penalty value by selecting a minimum of the specified maximum and a constant reduced by a value that is inversely proportional to the square root of the number of times the action identified by the tracking mechanism included in the advertisement has been identified during the duration (e.g., a constant decreased by a ratio of an additional constant (e.g., one) to the square root of the number of times the action identified by the tracking mechanism included in the advertisement has been identified during the duration.

Based on the subsidy value and the penalty value, the online system modifies a bid amount for the ad request. The online system increases the bid amount by a value that is based on the subsidy value and also decreases the bid amount by another value that is based on the penalty value. In some embodiments, the online system determines a scaling factor for the bid amount based on the subsidy value and on the penalty value and applies the scaling factor to the bid amount to modify the bid amount for the ad request. However, in other embodiments, the online system may modify the online system by increasing the bid amount based on the subsidy value and also decreasing the bid amount based on the penalty value. Because the pacing factor for the subsidy value is based on the penalty values for other opportunities to present one or more advertisements to users, the subsidy values and the penalty values for various opportunities to present one or more advertisements to online system users offset each other over an aggregation of opportunities to present one or more advertisements to users. Hence, the penalty value funds the subsidy value to the online system over multiple opportunities to present the advertisement from the ad request to various online system users.

In some embodiments, the online system determines the bid amount for the ad request ad request based on the budget included in the ad request and an amount of revenue received by the online system for online system users accessing the advertisement from the ad request during an amount of the duration that has lapsed when the opportunity to present one or more advertisements to the user was identified, and modifies the determined bid amount based on the subsidy value and the penalty value. Alternatively, the ad request includes a bid amount specifying an amount of compensation to the online system if a user presented with the advertisement in the ad request accesses the advertisement, and the online system modifies the bid amount included in the ad request based on the subsidy value and the penalty value. In other embodiments, the online system determines an expected value as a product of a bid amount for the ad request and a likelihood of the user accessing the advertisement in the ad request and modifies the expected value based on the penalty value and based on the subsidy value to generate the modified bid amount.

The online system includes the ad request in association with the modified bid amount in one or more selection processes that select one or more advertisements for presentation to the user via the identified opportunity. The one or more selection processes may select one or more advertisements for presentation to the user via the identified opportunity based at least in part on the bid amounts associated with various ad requests. For example, a selection process determines expected values for various ad requests, including the identified ad request, based on bid amounts associated with the ad requests and likelihoods of the user interacting with advertisements included in the ad requests. The selection process ranks the ad requests based on their expected values and selects ad requests having at least a threshold position in the ranking or selects ad requests having at least a threshold expected value. Advertisements from the selected ad requests are then communicated to a client device associated with the user for presentation. If the ad request is selected by one or more selection processes, the advertisement from the ad request is communicated to a client device associated with the user for presentation.

If the ad request is selected for presentation to the user, the online system determines a price charged to the user who provided the ad request to the online system if the user accesses the advertisement from the ad request. One or more of the selection processes determines a price based on the modified bid amount and bid amounts associated with other ad requests in the one or more selection processes. For example, a selection process determines the price based on bid amounts associated with other ad requests in the selection process that were not selected. To account for modification of the bid amount by the subsidy value and the penalty value when including the ad request in the one or more selection processes and prevent exceeding the bid amount of the ad request, the online system modifies the price determined by the one or more selection processes based on the subsidy value and based on the penalty value. For example, if the online system modifies the bid amount for the ad request by applying a scaling factor to the bid amount, the online system modifies the determined price by applying an inverse of the scaling factor to the price. Subsequently, the online system requests the modified price from the user who provided the ad request. Thus, while modification of the bid amount of the ad request based on the subsidy value and based on the penalty value increases a likelihood of the ad request being selected by the online system if the likelihood of the user performing the action identified by the tracking mechanism in the advertisement exceeds the average likelihood of online system users performing the action identified by the tracking mechanism in the advertisement, modifying the determined price if the ad request is selected prevents the price requested from the user who provided the ad request from exceeding the bid amount of the ad request.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
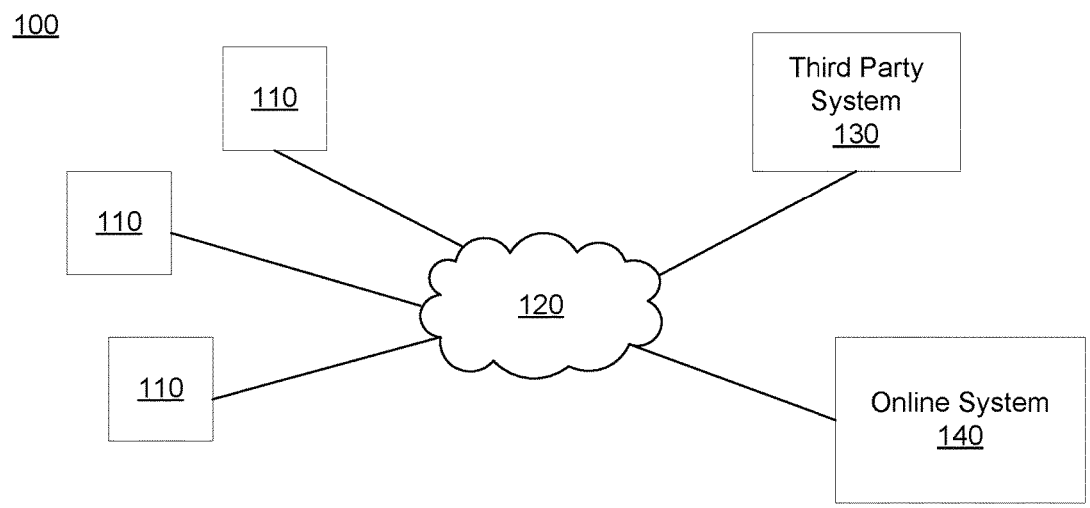
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 to the online system 140 in exchange presenting the advertisements to the online system 140. Content presented by the online system 140 for which the online system 140 receives compensation in exchange for presenting is referred to herein as "sponsored content," "sponsored content items," or "advertisements." Sponsored content from a third party system 130 may be associated with the third party system 130 or with another entity on whose behalf the third party system 130 operates.

Figure 2:
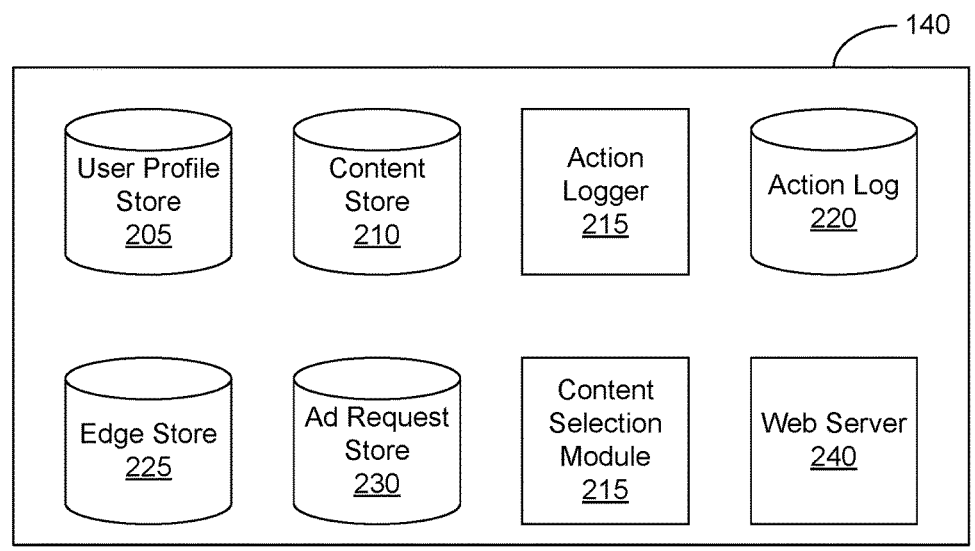
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. In various embodiments, the ad request store 230 includes one or more advertising campaigns, each advertising campaign including one or more ad requests. An ad request includes advertisement content, also referred to as an "advertisement," and a bid amount. The advertisement is text, image, audio, video, or any other suitable data presented to a user. The advertisement may also include a landing page specifying a network address to which a user is directed when the advertisement content is accessed. Additionally, the advertisement includes a tracking mechanism comprising instructions that are executed by a client device 110 presenting the advertisement when a user performs an action associated with the advertisement. A user providing the ad request to the online system 140 specifies one or more actions in the tracking mechanism so the tracking mechanism communicates information identifying when one or more of the specified actions were performed. For example, the tracking mechanism is a tracking pixel. In some embodiments, the advertisement includes information identifying the tracking mechanism, which is included in other content, or the advertisement includes the tracking mechanism itself. Including a tracking mechanism in the advertisement allows the user providing the ad request to the online system 140 to identify desired actions by users who are presented with the advertisement.

In some embodiments, the bid amount is associated with an ad request by a user providing the ad request to the online system 140 and is used to determine an expected value, such as monetary compensation, provided by the user to the online system 140 if an advertisement in the ad request is presented to another user, if the advertisement in the ad request receives an interaction from another user presented with the advertisement, or if any suitable condition is satisfied when the advertisement in the ad request is presented to another user. For example, the bid amount specifies a monetary amount that the online system 140 receives from an advertiser if an advertisement in an ad request is displayed. In some embodiments, the expected value to the online system 140 of presenting the advertisement may be determined by multiplying the bid amount by a probability of the advertisement being accessed by a user.

Alternatively, the user providing an ad request to the online system 140 does not associate a bid amount with the ad request, but includes a maximum amount of compensation the user providing the ad request to the online system 140 is willing to provide the online system 140 in exchange for an online system user interacting with the advertisement in the ad request. The online system 140 determines a bid amount for the ad request, subject to this maximum amount of compensation, based on a budget and a duration associated with the advertising campaign including the ad request. For example, a pacing value is determined from the budget associated with an advertising campaign including the ad request and an amount spent by an advertiser on the advertising campaign from a start date of the advertising campaign to a current time. The pacing value determines a bid amount for the ad request, altering spending of the ad request's budget throughout the duration of the advertising campaign.

Additionally, the ad request is associated with a duration and a budget. The budget specifies a total amount of compensation a user (e.g., an advertiser) associated with an advertising campaign provides the online system 140 for presenting advertisements from ad requests in the advertising campaign or for the online system 140 receiving interactions with advertisements from ad requests in the advertising campaign over the course of the duration. Additionally, the duration associated with the advertising campaign specifies a time interval during which advertisements from ad requests in the advertising campaign are presented to social networking system users. For example, if the duration of an advertising campaign is 30 days, advertisements included in the advertising campaign are presented to online system users for 30 days after the advertising campaign is provided to the online system 140. In some embodiments, the user providing the advertising campaign may also specify a start date for the advertising campaign, so the duration is measured from the specified start date.

Additionally, an ad request may include one or more targeting criteria specified by the user providing the ad request to the online system 140 (e.g., an advertiser). Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow a user to identify other users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows further refinement of users eligible to be presented with an advertisement from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 140 for presenting an advertisement from the ad request or for presenting the content item. For example, the expected value associated with an ad request is a product of the ad request's bid amount and a likelihood of the user interacting with the ad content from the ad request. The content selection module 235 may rank ad requests based on their associated bid amounts and select advertisements from ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and with ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

When selecting one or more advertisements for presentation to a user via an identified opportunity to present one or more advertisements, the content selection module 235 accounts for actions identified by a tracking mechanism included in an advertisement. If the content selection module 235 identifies an ad request including an advertisement having a tracking mechanism identifying an action by a user for inclusion in one or more selection processes, the content selection module 235 modifies a bid amount associated with the ad request to optimize performance of the action identified by the tracking mechanism by users who are presented with the advertisement. One or more selection processes performed by the content selection module 235 use the modified bid amount for the ad request when determining whether the advertisement from the ad request is presented to a user.

To modify the bid amount associated with the ad request when the ad request is included in one or more selection processes selecting content for presentation to a user, the content selection module 235 determines a likelihood of the user performing the action identified by the tracking pixel included in the advertisement and a likelihood of other users performing the action identified by the tracking pixel included in the advertisement. The content selection module 235 determines the likelihood of the user performing the action by applying one or more machine learned models to actions previously performed by the user from the action log 220, characteristics of the advertisement, and characteristics of the user from the user profile store 205, the action log 220, and the edge store 225. Characteristics of the user may include characteristics of content items with which the user previously performed the action identified by the tracking mechanism or with which the user previously performed other actions. The one or more machine learned models may determine the likelihood of the user performing the action identified by the tracking mechanism based on prior occurrences of the action by the user, characteristics of content items with which the user performed the action, and characteristics of the user. If the tracking mechanism included in the advertisement identifies a tracking mechanism included in additional content, the online system 140 determines the likelihood of the user performing the action identified by the tracking mechanism based on prior actions by the user (or by additional users having at least the threshold number or at least the threshold percentage of characteristics matching characteristics of the user) with the advertisement (or with other content having at least the threshold number or at least the threshold percentage of characteristics matching characteristics of the advertisement). In some embodiments, the content selection module 235 determines the likelihood of the user performing the action identified in the tracking mechanism based on prior performances of the action by additional users having at least a threshold number or a threshold percentage of characteristics matching characteristics of the user or actions performed by the user or by the additional users with content items having at least a threshold number or a threshold percentage of characteristics matching characteristics of the advertisement.

Similarly, the content selection module 235 applies one or more machined learned models to other users, as described above, to determine likelihoods of the other users performing the action identified by the tracking mechanism. From the likelihoods of the other users performing the action identified by the tracking mechanism, the content selection module 235 determines an average likelihood of online system users performing the action identified by the tracking mechanism in the advertisement. Based on a comparison of the likelihood of the user performing the action identified by the tracking mechanism in the advertisement and the average likelihood of online system users performing the action identified by the tracking mechanism in the advertisement, the content selection module 235 generates a subsidy value for increasing the bid amount for the ad request. In one embodiment, the subsidy value is a ratio of the likelihood of the user performing the action identified by the tracking mechanism in the advertisement and the average likelihood of online system users performing the action identified by the tracking mechanism in the advertisement. Hence, the subsidy value increases if the likelihood of the user performing the action identified by the tracking mechanism in the advertisement exceeds the average likelihood of online system users performing the action identified by the tracking mechanism in the advertisement. Generation of the subsidy value is further described below in conjunction with FIG. 3.

To offset the subsidy value over various opportunities to present the advertisement to different users, the content selection module 235 also generates a penalty value. In various embodiments, the penalty value is inversely related to a number of times the action identified by the tracking mechanism has been identified during the duration of the ad request. For example, the penalty value is a constant decreased by a ratio of another constant to a square root of the number of times the action identified by the tracking mechanism has been identified during the duration of the ad request. When the content selection module 235 modifies the bid amount for the ad request, the content selection module 235 both increases the bid amount based on the subsidy value and decreases the bid amount by the penalty value, as further described below in conjunction with FIG. 3. In various embodiments, the subsidy value includes a pacing factor that is determined from the penalty values and subsidy values determined for other opportunities to present advertisements to online system users for which the content selection module 235 included the ad request in one or more selection processes. As further described below in conjunction with FIG. 3, the content selection module 235 determines the pacing factor for the subsidy value so a total of the penalty values generated for various opportunities to present the advertisement from the ad request equals a total of products of pacing factors and ratios of likelihoods of users for whom advertisements were selected for presentation during performing the action identified by the tracking mechanism in the advertisement and the average likelihood of online system users performing the action identified by the tracking mechanism in the advertisement and pacing factors corresponding to the opportunities to present advertisements identified for the users. Determining the pacing factor for the subsidy value based on the penalty values for multiple opportunities to present one or more advertisements to users allows the online system 140 to generate the subsidy value so modifying the bid amount for an ad request by the subsidy value and by the penalty value over various opportunities to present one or more advertisements to online system users causes the penalty value to offset the subsidy value over the various opportunities to present one or more advertisements to online system users; hence, the penalty value funds the subsidy value to the online system 140 over multiple opportunities to present the advertisement from the ad request to various online system users.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 230. The retrieved ad requests and other content items are analyzed by the content selection module 235 to identify candidate content items that are likely to be relevant to the user. For example, content items associated with users who not connected to the user or content items associated with users for whom the user has less than a threshold affinity are discarded as candidate content items. Based on various criteria, the content selection module 235 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine an order in which selected content items or advertisements are presented via the feed. For example, the content selection module 235 orders content items or advertisements in the feed based on likelihoods of the user interacting with various content items or advertisements.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
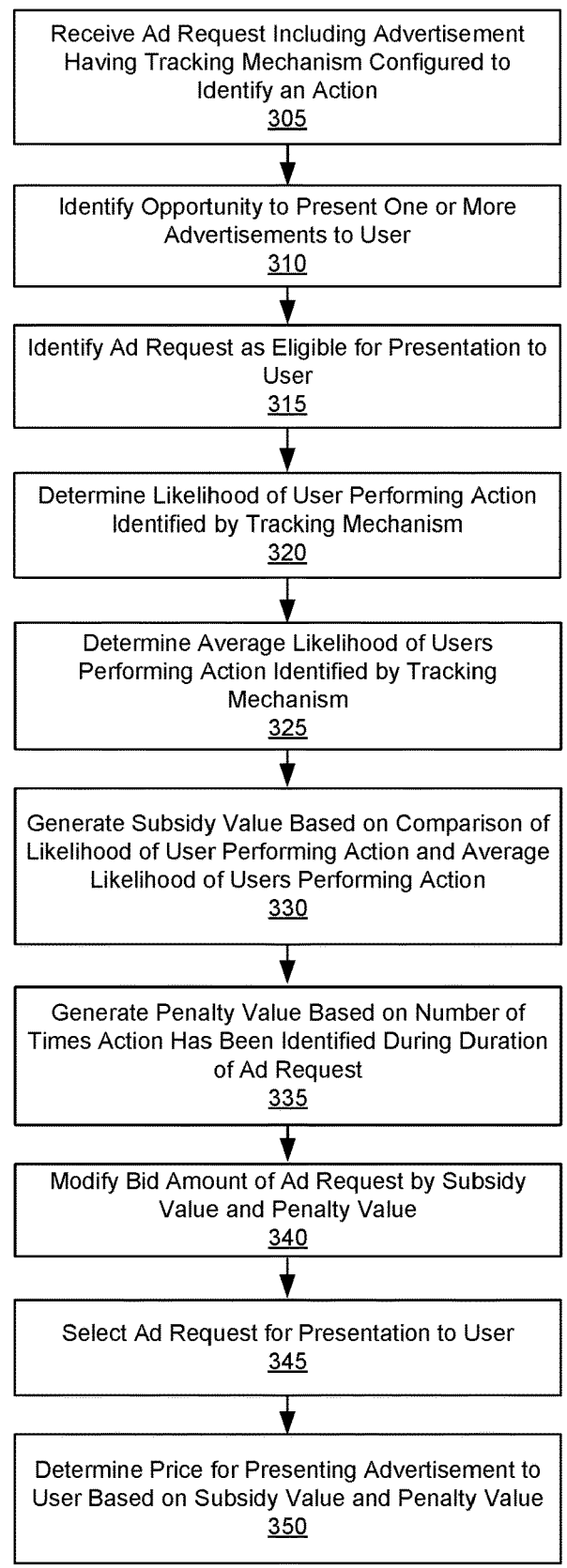
FIG. 3 is a flowchart of a method for modifying a bid amount associated with an advertisement request based on a likelihood of a user performing an action associated with the advertisement request, in accordance with an embodiment.

Modifying Advertisement Request Bid Amount Based on Likelihoods of a User Performing an Action Associated with the Ad Request FIG. 3 is a is a flowchart of one embodiment of a method for modifying a bid amount associated with an advertisement request ("ad request") based on a likelihood of a user performing an action associated with the advertisement request. In various embodiments, the steps described in conjunction with FIG. 3 may be performed in different orders than the order described in conjunction with FIG. 3. Additionally, the method may include different and/or additional steps than those described in conjunction with FIG. 3 in some embodiments.

The online system 140 receives 305 an advertisement request ("ad request") including an advertisement for presentation to online system users and a maximum amount of capable of being provided to the online system 140 for an online system user accessing the advertisement. For example, the maximum amount is a maximum amount of compensation the online system 140 will receive if an online system user presented with the advertisement accesses the advertisement. Additionally, the advertisement of the ad request includes a tracking mechanism comprising instructions that are executed by a client device 110 presenting the advertisement when a user performs an action associated with the advertisement. A user providing the ad request to the online system 140 specifies one or more actions in the tracking mechanism so the tracking mechanism communicates information identifying when one or more of the specified actions were performed. For example, the tracking mechanism is a tracking pixel. In some embodiments, the advertisement includes information identifying the tracking mechanism, which is included in other content, or the advertisement includes the tracking mechanism itself.

Additionally, the ad request may include a duration specifying a time interval during which the advertisement in the ad request is eligible for presentation to online system users. In some embodiments, the ad request also includes a budget specifying a maximum amount of compensation capable of being provided to the online system 140 for accessing the advertisement from the online system 140 when it is presented to online system users. In various embodiments, the online system 140 determines a bid amount for the ad request using the budget and the duration included in the ad request. Determining a bid amount for an ad request based on a budget for the ad request is further described in U.S. patent application Ser. No. 13/294,094, filed on Nov. 10, 2011, which is hereby incorporated by reference in its entirety. In some embodiments, the ad request is included in an advertising campaign including multiple ad requests; a budget, a duration, and a maximum amount of compensation to the online system 140 may be associated with the advertising campaign to include the budget, the duration, and the maximum amount of compensation to the online system 140 in various ad requests in the advertising campaign.

Hence, the ad request identifies a tracking mechanism that identifies an action associated with the advertisement, but includes a bid amount that is based on a user accessing the advertisement rather than performing the action associated with the advertisement. Because the bid amount is based on users accessing the advertisement rather than the action identified by the tracking mechanism, the bid amount may not allow the online system to select the advertisement for presentation to users who are more likely to perform the action identified by the tracking mechanism associated with the advertisement but who are less likely to access the advertisement. To increase the likelihood of the online system 140 selecting the advertisement for presentation to users who are likely to perform the action identified by the tracking mechanism associated with the advertisement, the online system 140 subsidizes the bid amount of the ad request in a selection process performed for a user who is more likely than other users to perform the action identified by the tracking mechanism associated with the advertisement, as further described below. The online system 140 also determines a penalty value applied to the bid amount for the advertisement in selection processes for various users so the cumulative penalty value for the ad request across multiple selection processes equals the cumulative subsidy for the ad request across multiple selection processes, allowing the penalty value to fund the subsidy for the ad request, as further described below.

When the online system 140 identifies 310 an opportunity to present one or more advertisements to a user of the online system, the online system 140 identifies 315 the ad request as eligible for presentation to the user. For example, the online system 140 receives a request for one or more advertisements from a client device 110 associated with the user and identifies 315 the ad campaign as eligible for presentation to the user if the user's characteristics satisfy at least a threshold number or a threshold percentage of targeting criteria included in the ad request. As another example, when the online system 140 receives a request for one or more advertisements from a client device 110 associated with the user, the online system 140 identifies 315 the ad request as eligible for presentation to the user if the ad request does not include targeting criteria.

Based on information associated with the user by the online system 140, the online system 140 determines 320 a likelihood of the user performing an action identified by the tracking mechanism included in the advertisement from the ad request. In various embodiments, the online system 140 applies one or more machine learned models to information stored by the online system 140 identifying prior actions by the user and characteristics of the advertisement to determine 320 the likelihood of the user performing the action identified by the advertisement. One or more of the machine learned models may account for actions previously performed with the advertisement or with additional content having at least a threshold number or a threshold percentage of characteristics matching characteristics of the advertisement by additional users having at least a threshold number or a threshold percentage of characteristics matching characteristics of the user. If the tracking mechanism included in the advertisement identifies a tracking mechanism included in additional content, the online system 140 determines 320 the likelihood of the user performing the action identified by the tracking mechanism based on prior actions by the user (or by additional users having at least the threshold number or at least the threshold percentage of characteristics matching characteristics of the user) with the advertisement (or with other content having at least the threshold number or at least the threshold percentage of characteristics matching characteristics of the advertisement).

Similarly, the online system 140 determines 325 an average likelihood of users performing the action identified by the tracking mechanism included in the advertisement from the ad request. In some embodiments, the online system 140 determines 325 an average likelihood of all online system users performing the action identified by the tracking mechanism included in the advertisement from the ad request. Alternatively, the online system 140 determines 325 an average likelihood of users having one or more specific characteristics performing the action identified by the tracking mechanism identified by the advertisement in the ad request. For example, the online system 140 determines 325 an average likelihood of users having characteristics satisfying at least a threshold number or at least a threshold percentage of targeting criteria included in the ad request performing the action identified by the tracking mechanism included in the advertisement. As another example, the online system 140 determines 325 an average likelihood of users having characteristics satisfying one or more specific targeting criteria included in the ad request performing the action identified by the tracking mechanism included in the advertisement.

To determine 325 the likelihood of users performing the action identified by the tracking mechanism included in the advertisement form the ad request, the online system 140 applies one or more machine learned models to information stored by the online system 140 identifying prior actions by users, characteristics of various users, and characteristics of the advertisement. For example, the online system 140 calculates likelihoods of multiple users performing the action identified by the tracking mechanism (e.g., multiple users having characteristics satisfying one or more targeting criteria included in the ad request), and determines 325 an average of the calculated likelihoods. As described above, the action for which the average likelihood is determined 325 may be an action with the advertisement or with additional content, with the online system 140 determining 325 the average likelihood based on prior actions by users with the advertisement (or with similar advertisements) or with the additional content (or other content similar to the additional content), respectively.

Based on a comparison of the likelihood of the user performing the action identified by the tracking mechanism in the advertisement and the average likelihood of online system users performing the action identified by the tracking mechanism in the advertisement, the online system 140 generates 330 a subsidy value. In one embodiment, the subsidy value is a ratio of the likelihood of the user performing the action identified by the tracking mechanism in the advertisement and the average likelihood of online system users performing the action identified by the tracking mechanism in the advertisement. The subsidy value increases if the likelihood of the user performing the action identified by the tracking mechanism in the advertisement exceeds the average likelihood of online system users performing the action identified by the tracking mechanism in the advertisement, while the subsidy value decreases if the likelihood of the user performing the action identified by the tracking mechanism in the advertisement is less than the average likelihood of online system users performing the action identified by the tracking mechanism in the advertisement.

The subsidy value also includes a pacing factor that is modified as the ad request is identified 315 as eligible for presentation to users via various opportunities to present advertisements to online system users. Modification of the pacing factor of the subsidy value is based on penalty values generated 335 by the online system 140, as further described below, for various identified opportunities to present advertisements to online system users. The online system 140 determines the pacing factor in the subsidy value so a total of the penalty values generated 335 for the ad request for other opportunities to present one or more advertisements to users and for the identified opportunity to present one or more advertisements to the users equals a total of products of pacing factors and ratios of likelihoods of users for whom advertisements were selected for presentation during performing the action identified by the tracking mechanism in the advertisement and the average likelihood of online system users performing the action identified by the tracking mechanism in the advertisement and pacing factors corresponding to the opportunities to present advertisements identified for the users. In the preceding example, the pacing factor for the subsidy value generated 330 for the identified opportunity is determined by determining a difference between a sum of penalty values generated for identified opportunities to present advertisements to online system users and a sum of products of scaling factors for other opportunities to present one or more advertisements to online system users and ratios for corresponding opportunities to present one or more advertisements to online system user of likelihoods of users for whom advertisements were selected for presentation during performing the action identified by the tracking mechanism in the advertisement and the average likelihood of online system users performing the action identified by the tracking mechanism in the advertisement corresponding, the online system 140 determines the pacing factor for the identified opportunity to present one or more advertisements to the user by dividing the difference by the ratio of a likelihoods of the user for whom the opportunity to present one or more advertisements was identified 310 performing the action identified by the tracking mechanism in the advertisement and the average likelihood of online system users performing the action identified by the tracking mechanism in the advertisement. Determining the pacing factor for the subsidy value based on the penalty values for other opportunities to present one or more advertisements to users allows the online system 140 to generate 330 the subsidy value so the penalty value offsets modification of the bid amount for the ad request by the subsidy value over various opportunities to present one or more advertisements to online system users; hence, the penalty value funds the subsidy value to the online system 140 over multiple opportunities to present the advertisement from the ad request to various online system users.

Additionally, the online system 140 generates 335 penalty value based on a number of times the action identified by the tracking mechanism in the advertisement has been identified during the duration of the ad request. The number of times the action identified by the tracking mechanism in the advertisement may be obtained from information received by the online system 140 when client devices 110 execute the tracking mechanism or may be obtained from a third party system 130 that receives information when client devices 110 execute the tracking mechanism. If a third party system 130 receives information identifying occurrences of the action identified by the tracking mechanism when client devices 110 execute the tracking mechanism, the third party system 130 may periodically communicate the number of times the action identified by the tracking mechanism has been identified during the duration or may communicate the number of times the action identified by the tracking mechanism has been identified during the duration in response to a request from the online system 140.

In various embodiments, the penalty value is inversely related to a number of times the action identified by the tracking mechanism included in the advertisement has been identified during the duration. For example, the penalty value is generated 335 as a constant reduced by a value that is inversely proportional to a square root of the number of times the action identified by the tracking mechanism included in the advertisement has been identified during the duration (e.g., during a portion of the duration that has lapsed between a starting time of the duration and a time when the opportunity to present one or more advertisements to the user was identified 310). As an example, the penalty value is generated 335 as a constant decreased by a ratio of an additional constant (e.g., one) to a square root of the number of times the action identified by the tracking mechanism included in the advertisement has been identified during the duration (e.g., during a portion of the duration that has lapsed between a starting time of the duration and a time when the opportunity to present one or more advertisements to the user was identified 310). However, the penalty value is may be generated 335 using any suitable function that is inversely related (e.g., inversely proportional) to the square root of the number of times the action identified by the tracking mechanism included in the advertisement has previously been identified during the duration.

In some embodiments, the online system 140 has a specified maximum (e.g., 0.15, 0.20) for the penalty value and accounts for the specified maximum when generating 335 the penalty value. For example, the online system 140 generates 335 the penalty value by selecting a minimum of the specified maximum and a constant reduced by a value that is inversely proportional to the square root of the number of times the action identified by the tracking mechanism included in the advertisement has been identified during the duration (e.g., a constant decreased by a ratio of an additional constant (e.g., one) to the square root of the number of times the action identified by the tracking mechanism included in the advertisement has been identified during the duration.

Based on the subsidy value and the penalty value, the online system 140 modifies 340 a bid amount for the ad request. The online system 140 increases the bid amount by a value that is based on the subsidy value and also decreases the bid amount by another value that is based on the penalty value. In some embodiments, the online system 140 determines a scaling factor for the bid amount based on the subsidy value and on the penalty value and applies the scaling factor to the bid amount to modify 340 the bid amount for the ad request. For example, the online system 140 determines the scaling factor by decreasing a constant (e.g., one) by the penalty value and increasing the decreased constant by the subsidy value. Alternatively, the online system 140 determines the scaling factor by increasing the constant by the subsidy value then decreasing the increased constant by the penalty value. Hence, to determine the scaling factor, the online system 140 increases a constant by the subsidy value and also decreases the constant by the penalty value. The online system 140 modifies 340 the bid amount for the ad request by applying the scaling factor to the bid amount. However, in other embodiments, the online system 140 may modify 340 the online system 140 by increasing the bid amount based on the subsidy value and also decreasing the bid amount based on the penalty value.

In some embodiments, the online system 140 determines the bid amount for the ad request ad request based on the budget included in the ad request and an amount of revenue received by the online system 140 for online system users accessing the advertisement from the ad request during an amount of the duration that has lapsed when the opportunity to present one or more advertisements to the user was identified 310, as further described in U.S. patent application Ser. No. 13/294,094, filed on Nov. 10, 2011, which is hereby incorporated by reference in its entirety. The online system 140 then modifies 340 the determined bid amount based on the subsidy value and the penalty value. Alternatively, the ad request includes a bid amount specifying an amount of compensation to the online system 140 if a user presented with the advertisement in the ad request accesses the advertisement, and the online system 140 modifies 340 the bid amount included in the ad request based on the subsidy value and the penalty value. In other embodiments, the online system 140 determines an expected value as a product of a bid amount for the ad request and a likelihood of the user accessing the advertisement in the ad request and modifies 340 the expected value based on the penalty value and based on the subsidy value to generate the modified bid amount.

Because the online system 140 determines the pacing factor for the subsidy value based on the penalty values for other opportunities to present one or more advertisements to users, as described above, over multiple opportunities to present one or more advertisements to online system users, modifying 340 the bid amount of the ad request by the subsidy value is offset by also modifying 340 the bid amount by the penalty value. Thus, an aggregation of the subsidy values for different opportunities to present one or more advertisements to various users equals an aggregation of the penalty values for the different opportunities to present one or more advertisements to various users. This allows the penalty value to fund the subsidy value to the online system 140 over multiple opportunities to present the advertisement from the ad request to various online system users.

The online system 140 includes the ad request in association with the modified bid amount in one or more selection processes that select one or more advertisements for presentation to the user via the identified opportunity. The one or more selection processes may select one or more advertisements for presentation to the user via the identified opportunity based at least in part on the bid amounts associated with various ad requests. For example, as further described above in conjunction with FIG. 2, a selection process determines expected values for various ad requests, including the identified ad request, based on bid amounts associated with the ad requests and likelihoods of the user interacting with advertisements included in the ad requests. The selection process ranks the ad requests based on their expected values and selects ad requests having at least a threshold position in the ranking or selects ad requests having at least a threshold expected value. Advertisements from the selected ad requests are then communicated to a client device 110 associated with the user for presentation. If the ad request is selected 345 by one or more selection processes, the advertisement from the ad request is communicated to a client device 110 associated with the user for presentation. In some embodiments, when the advertisement from the ad request is communicated to the client device 110 associated with the user, the online system 140 stores information associated with the user indicating the advertisement from the ad request was presented to the user and a time when the advertisement from the identified ad request was presented to the user.

Additionally, if the ad request is selected 345 for presentation to the user, the online system 140 determines 350 a price charged to the user who provided the ad request to the online system if the user accesses the advertisement from the ad request. One or more of the selection processes determines a price based on the modified bid amount and bid amounts associated with other ad requests in the one or more selection processes. For example, a selection process determines the price based on bid amounts associated with other ad requests in the selection process that were not selected. Other information may be used by various selection processes to determine the price for the ad request when the ad request is selected 345. To account for modification of the bid amount by the subsidy value and the penalty value when including the ad request in the one or more selection processes, the online system 140 modifies the price determined by the one or more selection processes based on the subsidy value and based on the penalty value. For example, if the online system 140 modifies 345 the bid amount for the ad request by applying a scaling factor to the bid amount, the online system 140 modifies the determined price by applying an inverse of the scaling factor to the price. In other embodiments, the online system 140 modifies the price determined by one or more selection processes that selected 345 the ad request by an inverse of a function based on the subsidy value and the penalty value that modified 340 the bid amount. Subsequently, the online system 140 requests the modified price from the user who provided the ad request. Thus, while modification of the bid amount of the ad request based on the subsidy value and based on the penalty value increases a likelihood of the ad request being selected by the online system if the likelihood of the user performing the action identified by the tracking mechanism in the advertisement exceeds the average likelihood of online system users performing the action identified by the tracking mechanism in the advertisement, modifying the determined price if the ad request is selected prevents the price requested from the user who provided the ad request from exceeding the bid amount of the ad request.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, an advertisement request ("ad request") including an advertisement for presentation to one or more users of the online system, a maximum amount of compensation provided to the online system for presenting the advertisement, a budget for presenting the ad request over a duration, and a tracking mechanism configured to identify an action performed by online system users presented with the advertisement;
identifying an opportunity to present one or more advertisements to a user of the online system;
identifying the ad request as eligible for presentation to the user;
determining a likelihood of the user performing the action identified by the tracking mechanism included in the advertisement based on information associated with the user by the online system;
determining an average likelihood of users performing the action identified by the tracking mechanism included in the advertisement based on information associated with additional users by the online system;
generating a subsidy value based on a comparison of the likelihood of the user performing the action identified by the tracking mechanism included in the advertisement to the average likelihood of users performing the action identified by the tracking mechanism included in the advertisement;
generating a penalty value based on a number of the action identified by the tracking mechanism included in the advertisement previously identified during the duration, wherein the subsidy value includes a pacing factor determined so a combination of penalty values generated for multiple opportunities to present advertisements to users of the online system equals a combination of subsidy values generated for multiple opportunities to present advertisements to users of the online system;
determining a bid amount associated with the ad request based on the budget included in the ad request;
modifying the bid amount associated with the ad request based on the subsidy value and the penalty value; and
including the ad request and the modified bid amount associated with the ad request in one or more selection processes selecting content for presentation to the user.

2. The method of claim 1, wherein modifying the bid amount associated with the ad request based on the subsidy value and the penalty value comprises:
generating a scaling factor based on the subsidy value and the penalty value; and
applying the scaling factor to the bid amount associated with the ad request.

3. The method of claim 2, wherein the scaling factor comprises a constant decreased by the penalty value and increased by the subsidy value.

4. The method of claim 1, wherein the penalty value is inversely related to a number of times the action identified by the tracking mechanism included in the advertisement has been identified during the duration.

5. The method of claim 1, wherein the penalty value is inversely related to a square root of a number of times the action identified by the tracking mechanism included in the advertisement has been previously identified during the duration.

6. The method of claim 5, wherein generating the penalty value based on the number of the action identified by the tracking mechanism included in the advertisement previously identified during the duration comprises:
   determining the penalty value as a minimum of a specified maximum for the penalty value and a constant decreased by a value that is inversely proportional to the square root of the number of times the action identified by the tracking mechanism included in the advertisement has been previously identified during the duration.

7. The method of claim 1, further comprising:
   selecting the advertisement from ad request for presentation to the user via the one or more selection processes;
   determining a price for presenting the advertisement from the ad request to the user based on the modified bid amount and bid amounts associated with additional ad requests in the one or more selection processes;
   modifying the price by based on the subsidy value and the penalty value; and
   requesting the modified price for presenting the advertisement from the ad request to the user.

8. The method of claim 7, wherein the modified bid amount comprises the bid amount associated with the ad request modified by a scaling factor generated from the subsidy value and the penalty value, and wherein modifying the price by based on the subsidy value and the penalty value comprises:
   applying an inverse of the scaling factor to the price.

9. The method of claim 1, wherein generating the subsidy value based on the comparison of the likelihood of the user performing the action identified by the tracking mechanism included in the advertisement to the average likelihood of users performing the action identified by the tracking mechanism included in the advertisement comprises:
   generating the subsidy value as a ratio of the likelihood of the user performing the action identified by the tracking mechanism included in the advertisement to the average likelihood of users performing the action identified by the tracking mechanism.

10. A computer program product comprising a computer-readable storage medium having instructions encoded thereon that, when executed by a processor, cause the processor to:
    receive, at an online system, an advertisement request ("ad request") including an advertisement for presentation to one or more users of the online system, a maximum amount of compensation provided to the online system for presenting the advertisement, a budget for presenting the ad request over a duration, and a tracking mechanism configured to identify an action performed by online system users presented with the advertisement;
    identify an opportunity to present one or more advertisements to a user of the online system;
    identify the ad request as eligible for presentation to the user;
    determine a likelihood of the user performing the action identified by the tracking mechanism included in the advertisement based on information associated with the user by the online system;
    determine an average likelihood of users performing the action identified by the tracking mechanism included in the advertisement based on information associated with additional users by the online system;
    generate a subsidy value based on a comparison of the likelihood of the user performing the action identified by the tracking mechanism included in the advertisement to the average likelihood of users performing the action identified by the tracking mechanism included in the advertisement;
    generate a penalty value based on a number of the action identified by the tracking mechanism included in the advertisement previously identified during the duration, wherein the subsidy value includes a pacing factor determined so a combination of penalty values generated for multiple opportunities to present advertisements to users of the online system equals a combination of subsidy values generated for multiple opportunities to present advertisements to users of the online system;
    determine a bid amount associated with the ad request based on the budget included in the ad request;
    modify the bid amount associated with the ad request based on the subsidy value and the penalty value; and
    include the ad request and the modified bid amount associated with the ad request in one or more selection processes selecting content for presentation to the user.

11. The computer program product of claim 10, wherein modify the bid amount associated with the ad request based on the subsidy value and the penalty value comprises:
    generate a scaling factor based on the subsidy value and the penalty value; and
    apply the scaling factor to the bid amount associated with the ad request.

12. The computer program product of claim 11, wherein the scaling factor comprises a constant decreased by the penalty value and increased by the subsidy value.

13. The computer program product of claim 10, wherein the penalty value is inversely related to a number of times the action identified by the tracking mechanism included in the advertisement has been identified during the duration.

14. The computer program product of claim 10, wherein the penalty value is inversely related to a square root of a number of times the action identified by the tracking mechanism included in the advertisement has been previously identified during the duration.

15. The computer program product of claim 14, wherein generate the penalty value based on the number of the action identified by the tracking mechanism included in the advertisement previously identified during the duration comprises:
    determine the penalty value as a minimum of a specified maximum for the penalty value and a constant decreased by a value that is inversely proportional to the square root of the number of times the action identified by the tracking mechanism included in the advertisement has been previously identified during the duration.

16. The computer program product of claim 10, wherein the computer readable storage medium further has instructions encoded thereon that, when executed by the processor, cause the processor to:
    select the advertisement from ad request for presentation to the user via the one or more selection processes;
    determine a price for presenting the advertisement from the ad request to the user based on the modified bid amount and bid amounts associated with additional ad requests in the one or more selection processes;

modify the price by based on the subsidy value and the penalty value; and request the modified price for presenting the advertisement from the ad request to the user.

17. The computer program product of claim 16, wherein the modified bid amount comprises the bid amount associated with the ad request modified by a scaling factor generated from the subsidy value and the penalty value, and wherein modify the price by based on the subsidy value and the penalty value comprises:

apply an inverse of the scaling factor to the price.

18. The computer program product of claim 10, wherein generate the subsidy value based on the comparison of the likelihood of the user performing the action identified by the tracking mechanism included in the advertisement to the average likelihood of users performing the action identified by the tracking mechanism included in the advertisement comprises:

generate the subsidy value as a ratio of the likelihood of the user performing the action identified by the tracking mechanism included in the advertisement to the average likelihood of users performing the action identified by the tracking mechanism.

19. A method comprising:

receiving, at an online system, an advertisement request ("ad request") including an advertisement for presentation to one or more users of the online system, a maximum amount of compensation provided to the online system for presenting the advertisement, a budget for presenting the ad request over a duration, and a tracking mechanism configured to identify an action performed by online system users presented with the advertisement;

identifying an opportunity to present one or more advertisements to a user of the online system;

identifying the ad request as eligible for presentation to the user;

determining a likelihood of the user performing the action identified by the tracking mechanism included in the advertisement based on information associated with the user by the online system;

determining an average likelihood of users performing the action identified by the tracking mechanism included in the advertisement based on information associated with additional users by the online system;

generating a subsidy value based on a comparison of the likelihood of the user performing the action identified by the tracking mechanism included in the advertisement to the average likelihood of users performing the action identified by the tracking mechanism included in the advertisement;

generating a penalty value based on a number of the action identified by the tracking mechanism included in the advertisement previously identified during the duration, wherein the penalty value is a minimum of a specified maximum for the penalty value and a constant decreased by a value inversely proportional to a square root of a number of times the action identified by the tracking mechanism included in the advertisement has been previously identified during the duration;

determining a bid amount associated with the ad request based on the budget included in the ad request;

modifying the bid amount associated with the ad request based on the subsidy value and the penalty value; and including the ad request and the modified bid amount associated with the ad request in one or more selection processes selecting content for presentation to the user.

20. The method of claim 19, wherein the subsidy value includes a pacing factor determined so a combination of penalty values generated for multiple opportunities to present advertisements to users of the online system equals a combination of subsidy values generated for multiple opportunities to present advertisements to users of the online system.

* * * * *

UNITED STATES PATENT AND TRADEMARK OFFICE
CERTIFICATE OF CORRECTION

PATENT NO. : 10,318,997 B2  
APPLICATION NO. : 15/136538  
DATED : June 11, 2019  
INVENTOR(S) : Anand Sumatilal Bhalgat Page 1 of 1

It is certified that error appears in the above-identified patent and that said Letters Patent is hereby corrected as shown below:

In the Claims

Column 25, Line 22, Claim 7, delete "modifying the price by based on the subsidy" and insert -- modifying the price based on the subsidy --.

Column 25, Line 30, Claim 8, delete "modifying the price by based on the subsidy" and insert -- modifying the price based on the subsidy --.

Column 26, Line 27, Claim 11, delete "wherein modify the bid amount associated" and insert -- wherein modifying the bid amount associated --.

Column 26, Line 47, Claim 15, delete "wherein generate the penalty value" and insert -- wherein generating the penalty value --.

Column 27, Line 1, Claim 16, delete "modify the price by based on the subsidy" and insert -- modify the price based on the subsidy --.

Column 27, Line 9, Claim 17, delete "wherein modify the price by based on the subsidy" and insert -- wherein modifying the price based on the subsidy --.

Column 27, Line 13, Claim 18, delete "wherein generate the subsidy value" and insert -- wherein generating the subsidy value --.

Signed and Sealed this  
Twenty-sixth Day of November, 2019

Andrei Iancu  
*Director of the United States Patent and Trademark Office*